US010097470B2

(12) United States Patent
Mathew et al.

(10) Patent No.: US 10,097,470 B2
(45) Date of Patent: Oct. 9, 2018

(54) NETWORK ANALYSIS INCLUDING GUARANTEEING CONSISTENT FLOW BY DYNAMICALLY SMOOTHING TRAFFIC BURSTS, ISOLATING NON-OPTIMALLY PERFORMING EXTERNAL SYSTEMS FROM MULTI-TENANT/SHARED SERVICES AND IMPLEMENTING DOWNSTREAM AWARE TRANSACTIONAL WORKFLOWS

(71) Applicant: Synchronoss Technologies, Inc., Bridgewater, NJ (US)

(72) Inventors: Dennis P. Mathew, Allentown, PA (US); Janet F. Sala, Belvidere, NJ (US)

(73) Assignee: Synchronoss Technologies, Inc., Bridgewater, NJ (US)

( * ) Notice: Subject to any disclaimer, the term of this patent is extended or adjusted under 35 U.S.C. 154(b) by 0 days.

(21) Appl. No.: 15/000,961

(22) Filed: Jan. 19, 2016

(65) Prior Publication Data
US 2016/0212053 A1    Jul. 21, 2016

Related U.S. Application Data

(60) Provisional application No. 62/105,604, filed on Jan. 20, 2015, provisional application No. 62/105,614, filed on Jan. 20, 2015, provisional application No. 62/105,620, filed on Jan. 20, 2015.

(51) Int. Cl.
*H04L 12/815*    (2013.01)

(52) U.S. Cl.
CPC ................................. *H04L 47/225* (2013.01)

(58) Field of Classification Search
CPC ...................................................... H04L 47/225
See application file for complete search history.

(56) References Cited

U.S. PATENT DOCUMENTS

| 6,282,187 B1 * | 8/2001 | Evans | H04W 72/0446 |
| | | | 370/347 |
| 2011/0314542 A1 * | 12/2011 | Viswanathan | G06F 21/554 |
| | | | 726/23 |
| 2015/0332145 A1 * | 11/2015 | Vasseur | G06N 5/04 |
| | | | 706/12 |

* cited by examiner

*Primary Examiner* — Ronald B Abelson
(74) *Attorney, Agent, or Firm* — Synchronoss Technologies, Inc.; Frederick W. Dour

(57) ABSTRACT

Network analysis including dynamic smoothing, isolating non-optimally performing systems and downstream aware transactional workflows is described herein. Each of the implementations, separately or together, is able to improve network functionality.

18 Claims, 5 Drawing Sheets

Metric Performance: Database Query Result for JDBC - B2B Orders Received last 5 minutes Scheduled downtime

NETWORK ANALYSIS INCLUDING GUARANTEEING CONSISTENT FLOW BY DYNAMICALLY SMOOTHING TRAFFIC BURSTS, ISOLATING NON-OPTIMALLY PERFORMING EXTERNAL SYSTEMS FROM MULTI-TENANT/SHARED SERVICES AND IMPLEMENTING DOWNSTREAM AWARE TRANSACTIONAL WORKFLOWS

CROSS-REFERENCE TO RELATED APPLICATION(S)

This application claims priority under 35 U.S.C. § 119(e) of the U.S. Provisional Patent Application Ser. No. 62/105,604, filed Jan. 20, 2015 and titled, "CONSTANT STREAM—GUARANTEEING CONSISTENT FLOW BY DYNAMICALLY SMOOTHING TRAFFIC BURSTS," the U.S. Provisional Patent Application Ser. No. 62/105,614, filed Jan. 20, 2015 and titled, "ISOLATING MISBEHAVING EXTERNAL SYSTEMS FROM MULTI-TENANT/SHARED SERVICES," and the U.S. Provisional Patent Application Ser. No. 62/105,620, filed Jan. 20, 2015 and titled, "SMART THROTTLE—DOWNSTREAM AWARE TRANSACTIONAL WORKFLOWS" which are all also hereby incorporated by reference in their entireties for all purposes.

FIELD OF THE INVENTION

The present invention relates to the field of networking. More specifically, the present invention relates to network analysis.

BACKGROUND OF THE INVENTION

A computer network or data network is a telecommunications network which allows computers to exchange data. In computer networks, networked computing devices pass data to each other along network links (data connections). Data is transferred in the form of packets. The connections between nodes are established using either cable media or wireless media. The best-known computer network is the Internet.

Network computer devices that originate, route and terminate the data are called network nodes. Nodes can include hosts such as personal computers, smart phones, servers as well as networking hardware. Two such devices are said to be networked together when one device is able to exchange information with the other device, whether or not they have a direct connection to each other.

Computer networks differ in the transmission media used to carry their signals, the communications protocols to organize network traffic, the network's size, topology and organizational intent. In most cases, communications protocols are layered on other more specific or more general communications protocols, except for the physical layer that directly deals with the transmission media.

Previous solutions of managing traffic flow follow a pattern of decreasing the interval and trying to stagger threads. Previous solutions for throughput issues follow patterns of time-outs and retries.

SUMMARY OF THE INVENTION

Network analysis including dynamic smoothing, isolating non-optimally performing systems and downstream aware transactional workflows is described herein. Each of the implementations, separately or together, is able to improve network functionality.

DETAILED DESCRIPTION OF THE PREFERRED EMBODIMENT

To improve the performance of networked systems, network analysis methods such as dynamic smoothing, isolating non-optimally performing systems and downstream aware transactional workflows are able to be implemented.

Dynamic Smoothing

Orders (e.g., network packets or other content) are received in a continuous stream and persisted to a Relational Database (RDB). Orders are read from the RDB and forwarded (e.g., using a First In First Out (FIFO) implementation) in a controlled fashion (e.g., periodically, such as every minute). Reading takes time, and as the backlog grows, reading takes continuously longer. By introducing a cache that runs 10 seconds before the Read process, the Read happens from the cache rather than from the RDB. A per minute (or other time period) forwarding rate is defined. If a cache record count is less than a 3× forwarding rate, a 1× rate is fetched by the cache. This limits the size of the cache to avoid cache overflow. To improve the forwarding action, the forwarding operation is multi-threaded. Forwarding is implemented as a thread pool with a process_batch function (pseudo code is included herein) that runs every minute (or other time frame). The thread pool is dynamically configured. The number of threads is based on the forwarding rate. To do this, the system determines how long it takes to forward a single order and how this is negatively affected by volume. So several assumptions are made:

forwarding rate can be set dynamically [RATEperMINUTE];

Max_response_time_expected; and

Minimum_allocated_response_time is allocated to the thread for a single transaction.

Using these two values, the thread count is re-calculated.

There is an actual delay that is less than the Maximum delay. Each time a thread is sent, it records the delay. Every thirty seconds (or other time frame), the average actual delay is used to calculate the new thread count plus a pre-defined percentage delay.

Figure 1:
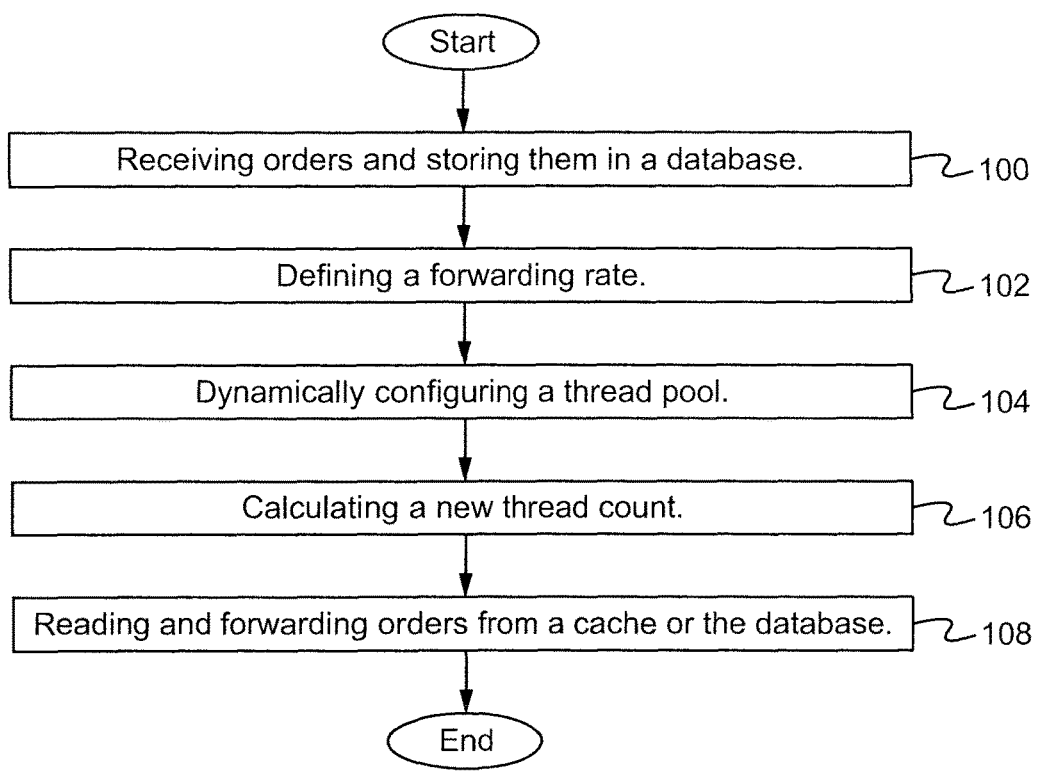
FIG. 1 illustrates a flowchart of implementing a dynamic smoothing method according to some embodiments.

FIG. 1 illustrates a flowchart of implementing a dynamic smoothing method according to some embodiments. In the step 100, orders are received in a continuous stream and persisted to (e.g., stored in) an RDB. In the step 102, a per minute (or other) forwarding rate is defined. In the step 104, a thread pool is dynamically configured. The number of threads is based on a forwarding rate. To do this, the system determines how long it takes to forward a single order and how this is negatively affected by volume. Several assumptions are made to perform the dynamic configuration: the forwarding rate can be set dynamically [RATEperMINUTE], the thread count is recalculated using: Max_response_time_expected and Minimum_allocated_response_time, and that there is an actual delay that is less than the Maximum delay. Each time a thread is sent, it records the delay. In the step 106, every thirty seconds (or other time frame), the average actual delay is used to calculate the new thread count plus some pre-defined percentage delay. In the step 108, orders are read from a cache or the RDB and forwarded (e.g., using a FIFO implementation) in a controlled fashion (e.g., every minute). If a cache record count is less than a 3× forwarding rate, a 1× rate is fetched by the cache. In some embodiments, different ratios are utilized; for example, if the cache record count is less than a 4× forwarding rate, a 1.5× rate is fetched by the cache. Forwarding is implemented as a thread pool with a process_batch function that runs periodically. In some embodiments, fewer or additional steps are implemented. In some embodiments, the order of the steps is modified.

Pseudo Code:

```
int last_avg_response_time 0;
int response_time_cumulative = 0;
list order list;
int MIN ALLOCATED RESPONSE TIME 1000;
int MAX ALLOCATED RESPONSE TIME 5000;
int BATCH DURATION = 30000; //milli seconds
function process_batch( ) {
    order_list = get_orders_from_cache( );
    int order_count = order list.size( );
    int response_time_predicted = last_avg_response_time * 1.5;
    int max_response_time_expected = response_time_predicted;
    if (max_response_time_expected < MIN_ALLOCATED_RESPONSE_TIME)
        max_response_time_expected = MIM_ALLOCATED_RESPONSE_TIME;
    else if(max_response_time_expected > MAX_ALLOCATED_RESPONSE_TIME)
        max_response_time_expected = MAX_ALLOCATED_RESPONSE_TIME;
    )
    int max_message_per_thread = (int) batch_duration/max_response_time_expected;
    if (max_message_per_thread < 1)
        max_message_per thread = 1;
    int num_threads = order_count/max_message_per_thread;
    if (order_count%max_message_per_thread > 0)
        num_threads = num_threads+1;
    int orders_per_thread = order_count/num_threads;
    int millis_per_order = (int) batch_duration / orders_per_thread;
    response_time_cumulative = 0; //reset response time aggregator
    for (num threads)
        start thread post_orders(batch_duration, millis_per order);
    wait_for_threads_to_finish( );
    last_avg_response_time = response_time_cumulative/order_count;
}
string post_orders (batch_duration, interval) {
    int interval = 0;
    int over_shoot = 0;
    long time_remaining batch_duration;
    int order_count = 0;
    string trx_id = null;
    while (trx_id = nextOrder( ) != null){
        orderCount++;
        int this_interval interval – over_shoot;
        over_shoot = 0;
        int elapsed = post_order(trx_id);
        if( elapsed > this_interval)
            overShoot = elapsed – this_interval;
        if (this_interval> elapsed)
            sleep(this_interval – elapsed);
        response_time_cumulative = response_time_cumulative+elapsed;
    }
}
string nextOrder( ) {
    string trx_id = order_list.get(0);
    if(trx_id != null)
        order_list.remove(trx_id);
    return trx_id;
}
```

Figure 2:
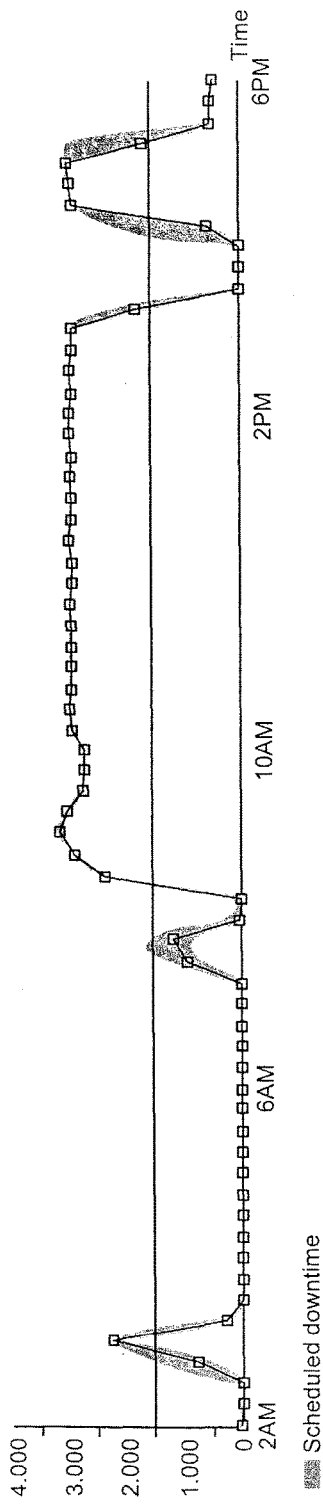
FIG. 2 illustrates a production example using dynamic smoothing configured to send at 600 transactions per minute.

Dynamically smoothing traffic bursts enables forwarding in a reliable, constant rate to improve resource utilization and guarantee a throughput volume. FIG. 2 illustrates a production example using dynamic smoothing configured to send at 600 transactions per minute.

Figure 3:
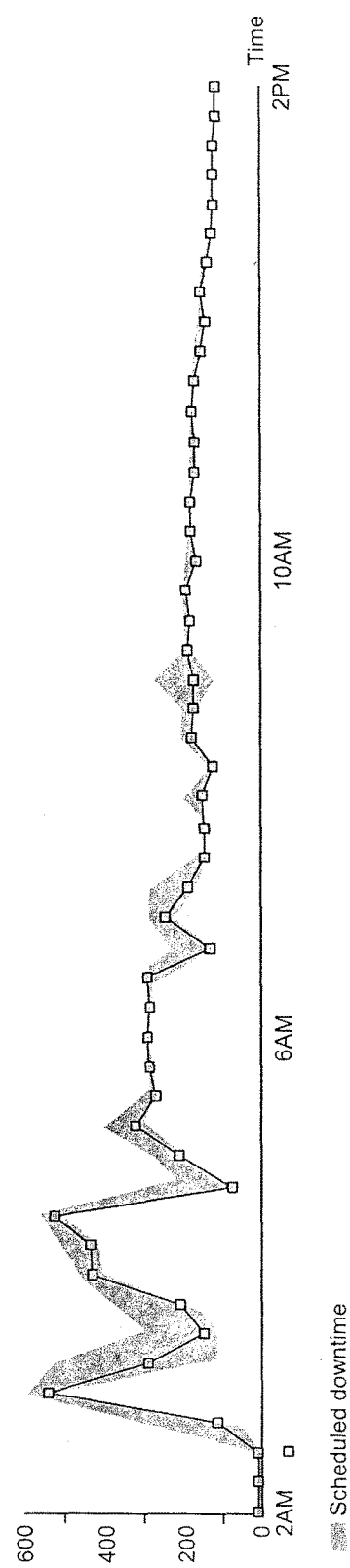
FIG. 3 illustrates a production example using existing art, attempting to send at 400 transactions per minute.

Previous methods produce a sawtooth graph of throughput which is inefficient and results in the inability to achieve steady throughput. FIG. 3 illustrates a production example using existing art, attempting to send at 400 transactions per minute.

Isolating Non-Optimally Performing Systems

Isolating non-optimally performing systems tracks the expected volume and type of transactions from a specifically served external system. If the external system sends volume above an expected volume (e.g., a Service Level Agreement (SLA)) or of transactional types that are not supported by the receiving system (e.g., Interface Agreement), then that single partner can be cut off until business partners agree that the situation has been resolved. Such instances of unprecedented volume or unsupported transaction types are commonly referred to as Denial of Service (DoS) Attacks.

In a Denial of Service Attack, the targeted system either crashes or is removed from network availability. This results in situations where multi-tenant services can be rendered unavailable to compliant parties because of misbehavior (intentional or unintentional) from another party. By isolating and cutting off the single offending party, the service can remain functional and available to compliant service users. Additionally, this is self-correcting to minimize traffic impact.

Figure 4:
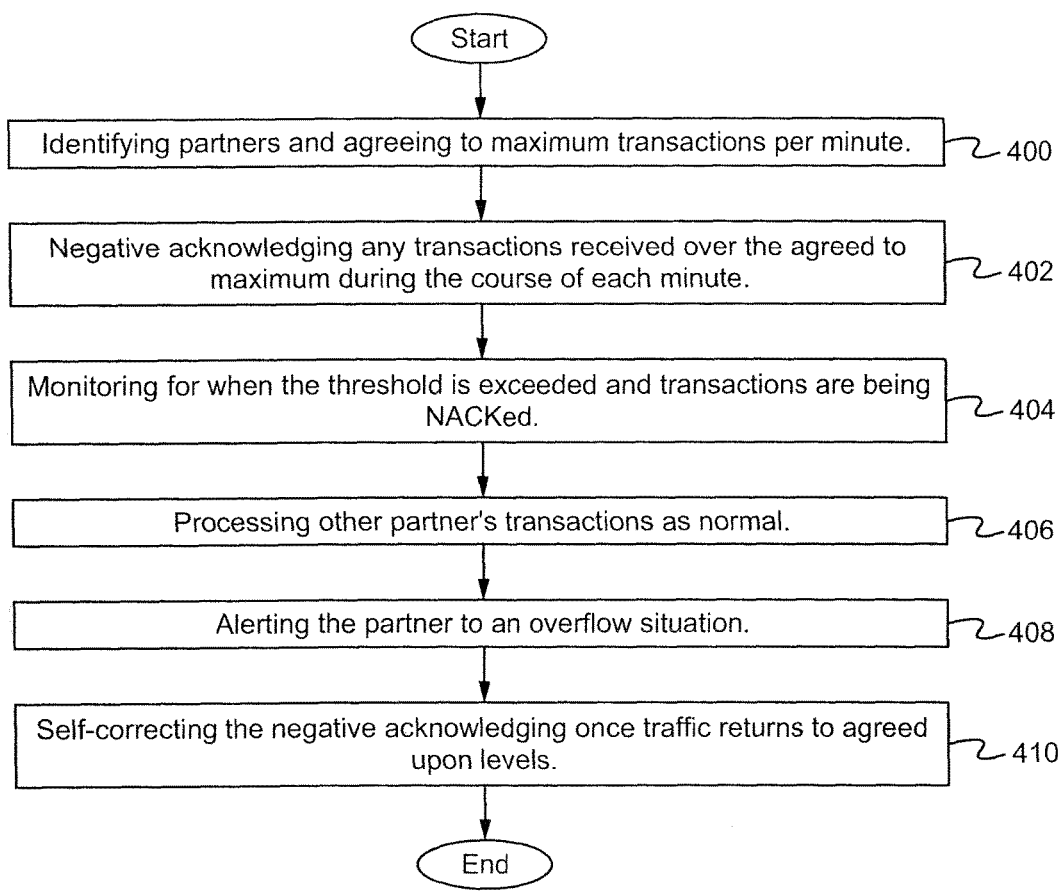
FIG. 4 illustrates a flowchart of implementing a behavior isolating method according to some embodiments.

FIG. 4 illustrates a flowchart of implementing a behavior isolating method according to some embodiments. In the step 400, partners are identified and maximum transactions per minute (or other time period) are agreed to. When a transaction is received from a partner (e.g., computing device), the transaction is counted as one. In the step 402, during the course of each minute (or other time period), any transactions received over the agreed to maximum are negative acknowledged (NACKed). In the step 404, the process monitors for when the threshold is exceeded and transactions are being NACKed. In the step 406, other partner's transactions continue being processed as normal. In the step 408, a partner is alerted to an overflow situation. In the step 410, NACKing is self-correcting once traffic returns to agreed upon levels. For example, if the transactions per minute is below the allowed maximum, the incoming traffic is Acknowledged (ACKed) instead of NACKed. In some embodiments, fewer or additional steps are implemented. In some embodiments, the order of the steps is modified.

Downstream Aware Transactional Flows

Series of computing systems are linked via networks and well-defined interface agreements. Transactions are passed among participating systems and broken down into a set of discrete actions causing information to be retrieved as a result of processing activity on an external system. This activity is referred to as an automated workflow.

Response times from these external systems can vary substantially. In addition, they are often faced with high volume situations or slower response times from downstream systems. Typically, such situations require the implementation of schemes such as scheduled retry or back off retry intervals. Other choices are to predict a volume and send a specific number of transactions per unit of time in an attempt to allocate demand across multiple workflows. All of these cases result in less effective utilization of both upstream and downstream resources.

Downstream aware transactional flows make use of the information gathered upstream about live response time behavior of downstream systems to adjust demand on those downstream systems.

Figure 5:
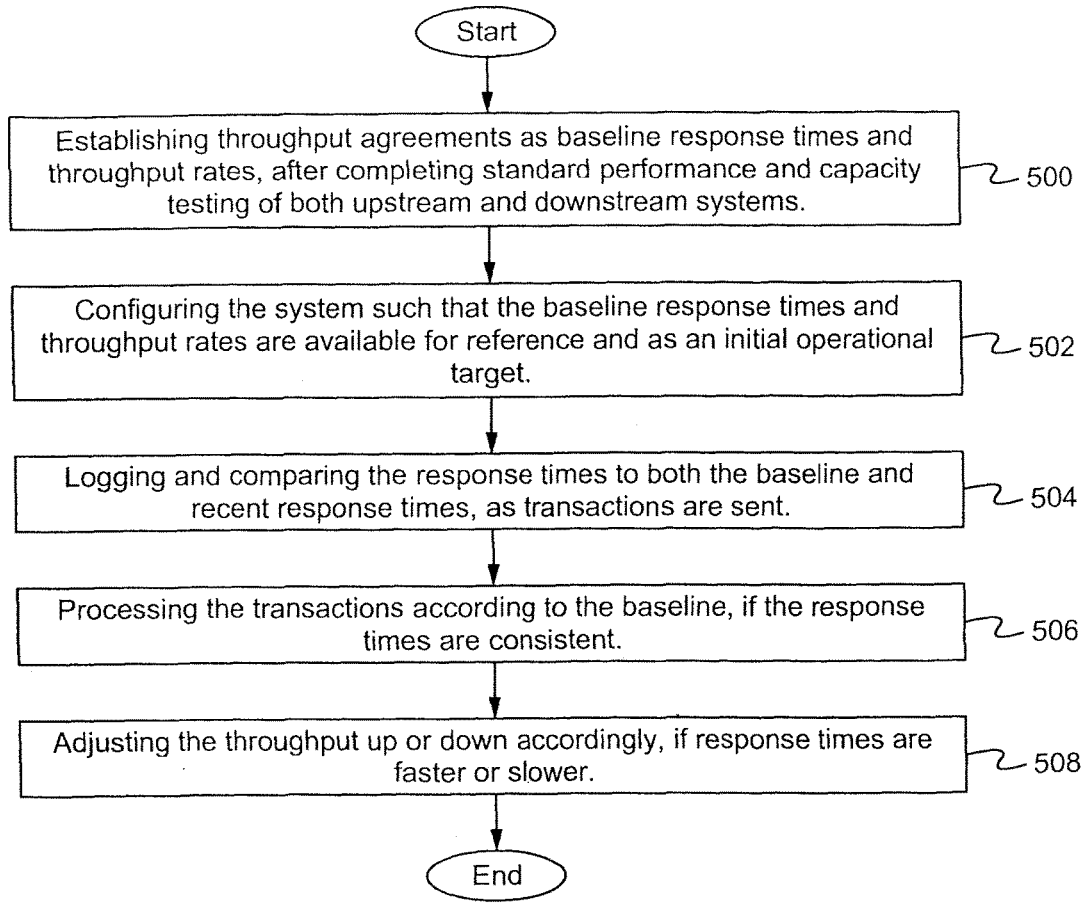
FIG. 5 illustrates a flowchart of implementing a downstream aware transactional workflow method according to some embodiments.

FIG. 5 illustrates a flowchart of implementing a downstream aware transactional workflow method according to some embodiments. In the step 500, after completing standard performance and capacity testing of both upstream and downstream systems, throughput agreements are established as baseline response times and throughput rates. In the step 502, the system is configured such that the baseline response times and throughput rates are available for reference and as an initial operational target. In the step 504, as transactions (e.g., packets) are sent, the response times are logged and compared to both the baseline and recent response times. In the step 506, if the response times are consistent, the transactions are processed according to baseline. In the step 508, if response times are faster, or slower, the throughput is adjusted up or down accordingly each minute (or other time period). For example, if response times are faster, then the throughput is adjusted up, and if the response times are slower, the throughput is adjusted down. When response times are slowing, the operational target is reduced to accommodate the most recent average actual response time plus 50%. When response times are accelerating, the operational target is increased to accommodate the most recent average actual response time. When average response times are within 10% of the current actual response time, the operational target remains constant. In some embodiments, fewer or additional steps are implemented. In some embodiments, the order of the steps is modified.

In some embodiments, the dynamic smoothing, isolating and downstream aware transactional workflow methods are able to be implemented separately or in any combination as network analysis methods.

Figure 6:
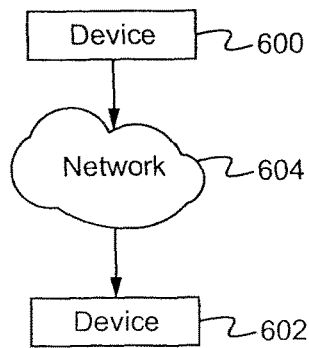
FIG. 6 illustrates a network of devices implementing the network analysis methods according to some embodiments.

FIG. 6 illustrates a network of devices implementing the network analysis methods according to some embodiments. A first device 600 (e.g., a computer, smart phone, tablet, laptop) and a second device 602 (e.g., a computer, smart phone, tablet, laptop) communicate through a network 604 or directly. The network 604 is able to be any network such as a wireless network, cellular network, the Internet, or a combination thereof.

For example, the first device 600 receives orders and stores them in a database, defines a forwarding rate, dynamically configures a thread pool, calculates a new thread count and reads and forwards orders from a cache or the database to the second device 602.

In another example, the first device 600 identifies partners and agrees to a maximum number of transactions per time period (transaction volume) for the second device 602. The first device 600 NACKs any transactions received from the second device 602 that exceed the agreed to maximum number of transactions per time period. The first device 600 also monitors for when the threshold is exceeded and transactions are being NACKed. The first device 600 continues to process other device transactions. The first device 600 notifies the second device 602 of the overflow situation and self-corrects the NACKing when traffic from the second device 602 returns below the threshold.

In yet another example, the first device 600 establishes throughput agreements as baseline response times and throughput rates. The first device 600 is configured such that the baseline response times and throughput rates are available for reference and as an initial operational target. As transactions are sent from the first device 600 to the second device 602 (or vice versa), the response times are logged and compared to both the baseline and recent response times. If the response times are consistent, the transactions are processed according to baseline. If response times are faster, or slower, the throughput is adjusted up or down accordingly each minute (or other time period).

In some embodiments, fewer or additional devices are utilized. For example, instead of only a first device and a second device, many devices are coupled through the network.

Figure 7:
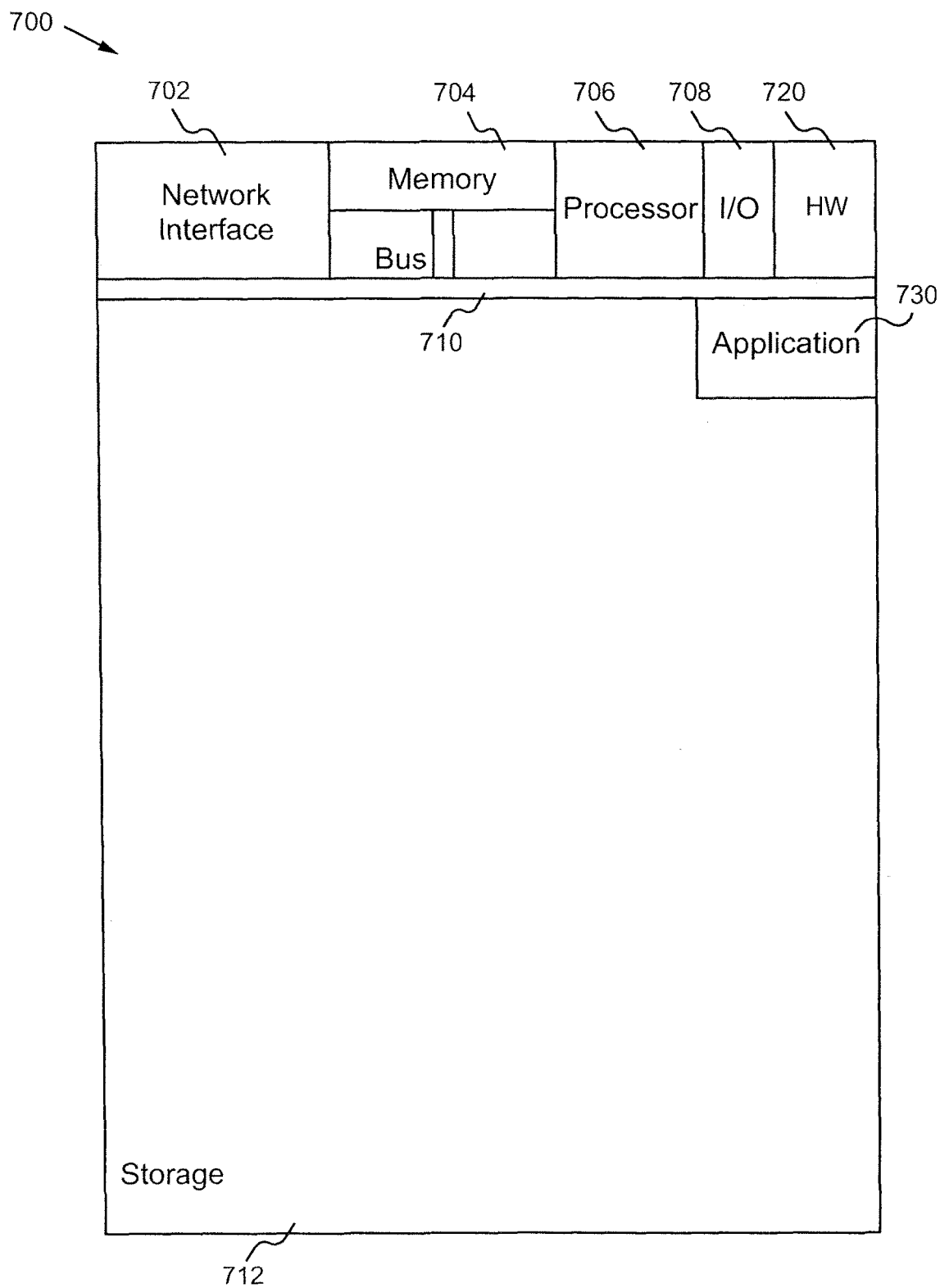
FIG. 7 illustrates a block diagram of an exemplary computing device configured to implement the network analysis methods according to some embodiments.

FIG. 7 illustrates a block diagram of an exemplary computing device configured to implement the network analysis methods according to some embodiments. The computing device 700 is able to be used to acquire, store, compute, process, communicate and/or display information. For example, a computing device 700 is a user/client device, a cloud device or any other device. In general, a hardware structure suitable for implementing the computing device 700 includes a network interface 702, a memory 704, a processor 706, Input/Output (I/O) device(s) 708, a bus 710 and a storage device 712. The choice of processor is not critical as long as a suitable processor with sufficient speed is chosen. The memory 704 is able to be any conventional computer memory known in the art. The storage device 712 is able to include a hard drive, CDROM, CDRW, DVD, DVDRW, Blu-Ray®, flash memory card or any other storage device. The computing device 700 is able to include one or more network interfaces 702. An example of a network interface includes a network card connected to an Ethernet or other type of LAN. The I/O device(s) 708 are able to include one or more of the following: keyboard, mouse, monitor, display, printer, modem, touchscreen, button interface and other devices. In some embodiments, the hardware structure includes multiple processors and other hardware to perform parallel processing. Network analysis application(s) 730 used to perform the network analysis methods are likely to be stored in the storage device 712 and memory 704 and processed as applications are typically processed. More or fewer components shown in FIG. 7 are able to be included in the computing device 700. In some embodiments, network analysis hardware 720 is included. Although the computing device 700 in FIG. 7 includes applications 730 and hardware 720 for implementing the network analysis methods, the network analysis methods are able to be implemented on a computing device in hardware, firmware, software or any combination thereof. For example, in some embodiments, the network analysis applications 730 are programmed in a memory and executed using a processor. In another example, in some embodiments, the network analysis hardware 720 is programmed hardware logic including gates specifically designed to implement the methods.

In some embodiments, the network analysis application(s) 730 include several applications and/or modules. In some embodiments, modules include one or more sub-modules as well.

Examples of suitable computing devices include a personal computer, a laptop computer, a computer workstation, a server, a mainframe computer, networking devices (e.g., hub, switch, router), a handheld computer, a personal digital assistant, a cellular/mobile telephone (e.g. an iPhone®), a smart appliance, a tablet computer (e.g. an iPad®), a smart watch, or any other suitable computing device.

To utilize the network analysis methods, one or more network devices are configured to implement the network analysis methods (e.g., in software) including dynamic smoothing so that transactions are more evenly sent, isolating a non-optimally performing device so that the remaining system is able to continue operating and downstream aware transactional workflows to further optimize throughput.

In operation, dynamic smoothing dynamically recalculates and makes use of response time as feedback. By pausing between sends, it spreads the "work" over the time allowed rather than bursting all transactions at the beginning of the interval. Additionally, the threads operate independently, being assigned responsibility for evenly distributing a distinct number of transactions. While this specific application of the dynamic smoothing is towards leveling the processing of transactions, it could also be employed as a tool for leveling more general data traffic on both public and private networks where the current topic of managing "burstiness" is a topic of interest and research.

In operation, isolating a non-optimally performing device enables that device to be analyzed and fixed while the remaining system or systems continue functioning properly.

In operation, the downstream aware transactional flows solve the problem of optimizing throughput in systems with unpredictable response times and throughput capability. The downstream aware transactional flows implementation is specifically unique because it dynamically recalculates and makes use of response time as feedback.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:
1. A system comprising:
a. at least one first device; and
b. at least one second device configured to communicate data with the at least one first device by dynamically smoothing traffic bursts of the data between the at least one first device and the at least one second device and by implementing downstream aware transactional workflows, wherein dynamically smoothing traffic bursts includes:
receiving orders and storing the orders in a database;
defining a forwarding rate;
dynamically configuring a thread pool;
calculating a new thread count; and
reading and forwarding the orders from a cache or the database.
2. The system of claim 1 wherein if a cache record count is less than a 3× forwarding rate, then a 1× rate is fetched by the cache.
3. The system of claim 1 wherein implementing downstream aware transactional workflows includes:
i. establishing throughput agreements as baseline response times and throughput rates;
ii. configuring the at least one second device such that the baseline response times and throughput rates are available for reference;
iii. logging and comparing response times to the baseline response times and recent response times, as transactions are sent;
iv. processing the transactions according to the baseline response times if the response times are consistent; and
v. adjusting the throughput up or down depending on if the response times are faster or slower.

4. The system of claim 1 wherein implementing downstream aware transactional workflows includes:
when response times are slowing, an operational target is reduced to accommodate a most recent average actual response time plus 50%;
when response times are accelerating, the operational target is increased to accommodate the most recent average actual response time; and
when average response times are within 10% of a current actual response time, the operational target remains constant.

5. The system of claim 1 further comprising isolating one of the at least one first device if the one of the at least one first device is determined to be non-optimally performing.

6. The system of claim 5 wherein isolating the one of the at least one first device includes:
a. identifying a maximum transactions threshold;
b. negative acknowledging any transactions received from the one of the at least one first device over the maximum transactions threshold;
c. processing transactions from other devices as usual;
d. alerting the one of the at least one first device to an overflow situation; and
e. self-correcting the negative acknowledging when traffic returns to below the maximum transactions threshold.

7. A method programmed in a non-transitory memory of a device comprising:
a. dynamically smoothing traffic bursts of the data between the device and at least one second device; and
b. implementing downstream aware transactional workflows between the device and the at least one second device, wherein dynamically smoothing traffic bursts includes:
receiving orders and storing the orders in a database;
defining a forwarding rate;
dynamically configuring a thread pool;
calculating a new thread count; and
reading and forwarding the orders from a cache or the database.

8. The method of claim 7 wherein if a cache record count is less than a 3× forwarding rate, then a 1× rate is fetched by the cache.

9. The method of claim 7 wherein implementing downstream aware transactional workflows includes:
i. establishing throughput agreements as baseline response times and throughput rates;
ii. configuring the at least one second device such that the baseline response times and throughput rates are available for reference;
iii. logging and comparing response times to the baseline response times and recent response times, as transactions are sent;
iv. processing the transactions according to the baseline response times if the response times are consistent; and
v. adjusting the throughput up or down depending on if the response times are faster or slower.

10. The method of claim 7 wherein implementing downstream aware transactional workflows includes:
when response times are slowing, an operational target is reduced to accommodate a most recent average actual response time plus 50%;
when response times are accelerating, the operational target is increased to accommodate the most recent average actual response time; and
when average response times are within 10% of a current actual response time, the operational target remains constant.

11. The method of claim 7 further comprising isolating one of the at least one second device if the one of the at least one second device is determined to be non-optimally performing.

12. The method of claim 11 wherein isolating the one of the at least one second device includes:
a. identifying a maximum transactions threshold;
b. negative acknowledging any transactions received from the one of the at least one first device over the maximum transactions threshold;
c. processing transactions from other devices as usual;
d. alerting the one of the at least second first device to an overflow situation; and
e. self-correcting the negative acknowledging when traffic returns to below the maximum transactions threshold.

13. An apparatus comprising:
a. a non-transitory memory for storing an application, the application for automatically:
i. dynamically smoothing traffic bursts of the data between the device and at least one second device;
ii. implementing downstream aware transactional workflows between the device and the at least one second device;
and
b. a processor coupled to the memory, the processor configured for processing the application,
wherein dynamically smoothing traffic bursts includes:
receiving orders and storing the orders in a database;
defining a forwarding rate;
dynamically configuring a thread pool;
calculating a new thread count; and
reading and forwarding the orders from a cache or the database.

14. The apparatus of claim 13 wherein if a cache record count is less than a 3× forwarding rate, then a 1× rate is fetched by the cache.

15. The apparatus of claim 13 wherein implementing downstream aware transactional workflows includes:
i. establishing throughput agreements as baseline response times and throughput rates;
ii. configuring the at least one second device such that the baseline response times and throughput rates are available for reference;
iii. logging and comparing response times to the baseline response times and recent response times, as transactions are sent;
iv. processing the transactions according to the baseline response times if the response times are consistent; and
v. adjusting the throughput up or down depending on if the response times are faster or slower.

16. The apparatus of claim 13 wherein implementing downstream aware transactional workflows includes:
when response times are slowing, an operational target is reduced to accommodate a most recent average actual response time plus 50%;
when response times are accelerating, the operational target is increased to accommodate the most recent average actual response time; and
when average response times are within 10% of a current actual response time, the operational target remains constant.

17. The apparatus of claim 13 wherein the application is further configured for isolating one of the at least one second device if the one of the at least one second device is determined to be non-optimally performing.

18. The apparatus of claim 17 wherein isolating the one of the at least one second device includes:

a. identifying a maximum transactions threshold;
b. negative acknowledging any transactions received from the one of the at least one second device over the maximum transactions threshold;
c. processing transactions from other devices as usual;
d. alerting the one of the at least one second device to an overflow situation; and
e. self-correcting the negative acknowledging when traffic returns to below the maximum transactions threshold.

* * * * *